(12) United States Patent
Ajay et al.

(10) Patent No.: US 7,784,358 B2
(45) Date of Patent: Aug. 31, 2010

(54) FLOW METERING DEVICE FOR A PLURALITY OF FLUID CARRIERS

(75) Inventors: Kemal Ajay, Mount Waverly (AU);
Arjun Vinoo Caprihan, Donvale (AU);
Ron Knox, Mounth Eliza (AU)

(73) Assignee: VFS Technologies Limited, Nassau (BS)

( * ) Notice: Subject to any disclaimer, the term of this patent is extended or adjusted under 35 U.S.C. 154(b) by 421 days.

(21) Appl. No.: 11/719,146

(22) PCT Filed: Nov. 14, 2005

(86) PCT No.: PCT/AU2005/001722
§ 371 (c)(1),
(2), (4) Date: Sep. 11, 2007

(87) PCT Pub. No.: WO2006/050569
PCT Pub. Date: May 18, 2006

(65) Prior Publication Data
US 2008/0066527 A1    Mar. 20, 2008

(30) Foreign Application Priority Data
Nov. 12, 2004  (AU) ............................. 2004906487

(51) Int. Cl.
*G01F 1/66* (2006.01)
(52) U.S. Cl. .................................... 73/861.28
(58) Field of Classification Search ............ None
See application file for complete search history.

(56) References Cited

U.S. PATENT DOCUMENTS

| | | | |
|---|---|---|---|
| 2,956,276 A * | 10/1960 | Friis | 342/361 |
| 4,308,754 A | 1/1982 | Pedersen et al. | |
| 5,052,230 A | 10/1991 | Lang et al. | |
| 5,533,408 A | 7/1996 | Oldenziel et al. | |
| 5,983,730 A | 11/1999 | Freund et al. | |
| 6,285,291 B1 * | 9/2001 | Knox et al. | 340/634 |
| 2006/0048577 A1 * | 3/2006 | Haque et al. | 73/599 |
| 2006/0254360 A1 * | 11/2006 | Haque et al. | 73/613 |
| 2008/0289422 A1 * | 11/2008 | Haque et al. | 73/599 |

FOREIGN PATENT DOCUMENTS

| | | |
|---|---|---|
| EP | 0 519 753 A2 | 12/1992 |
| GB | 2 177 206 A | 1/1987 |
| JP | 2000337936 | 8/2000 |
| WO | WO 88/00516 | 11/1988 |

* cited by examiner

*Primary Examiner*—Harshad Patel
(74) *Attorney, Agent, or Firm*—Sughrue Mion, PLLC

(57) ABSTRACT

A method and apparatus for determining flow in an aspirated particle detector system, includes a plurality of carriers in fluid communication with a particle detector, a flow rate detector in at least one of the carriers that senses a signal transmitted between a first and a second signal transceiver, wherein the first transceiver transceives signals in at least two of the carriers.

23 Claims, 7 Drawing Sheets a)

b)

c)

FLOW METERING DEVICE FOR A PLURALITY OF FLUID CARRIERS

RELATED APPLICATIONS

This application claims priority to Australian Provisional Patent Application No. 2004906487, filed 12 Nov. 2004 and entitled "Method and Apparatus for Determining Flow" and, the specification thereof is incorporated herein by reference in its entirety and for all purposes.

FIELD OF INVENTION

The present invention relates to the field of pollution monitoring equipment and in particular to aspirated particle detector systems. More particularly, the invention relates to an improvement in particle detector systems, which detect particles in air sampled from a number of locations. It will be convenient to hereinafter describe the invention in relation to the use of an ultrasonic means of flow sensing within an aspirated smoke detector system, however, it should be appreciated that the present invention is not limited to that use, only. For example, the present invention in one form relates to a method and apparatus for determining flow of a fluid. In the context of the present invention, it is to be taken that the term "fluid" applies to any material that displays liquid-like or gas-like behaviour or physical properties.

BACKGROUND OF INVENTION

Throughout this specification the use of the word "inventor" in singular form may be taken as reference to one (singular) or all (plural) inventors of the present invention. The inventor has identified the following related art. Particle detectors are useful in detecting smoke particles in an airstream as a means of determining whether a location may contain a thermal event. Sensitive smoke detectors, such as the VESDA™ LaserPlus™ smoke detector sold by Vision Fire and Security Pty Ltd, detect the number of particles in an airstream. Typical thermal events, such as combustion, produce significant quantities of airborne particles, and therefore detecting these particles is useful in determining whether there may be a thermal event in a particular location. One type of particle detector system uses a sampling network of pipes, each pipe having a number of apertures for sampling air along its length. In general, a sampling network may comprise a network of carriers, where carriers comprise pipes, tubes, ducts and the like for the distribution and flow of air. In the example smoke detector system mentioned, the sampling pipe network is connected to a particle detector, and an aspirator draws air through the pipes and into a particle detecting chamber. Using a pipe network, air may be sampled from a number of different points over an area. To maintain and improve upon the efficiency and effectiveness of an aspirated particle detector system, it is desirable to determine flow through the pipe network. By way of background, flowmeters suitable for determining the flow of a fluid, ordinarily in liquid state, through a fluid carrying pipe are disclosed in the following references.

WO 88/08516 (Micronics Limited), entitled "Ultrasonic Fluid Flowmeter" discloses a non-intrusive ultrasonic flowmeter operating on the principle of time-of-flight measurement comprising a first mounting block having a first fixed transducer being oriented to direct an ultrasonic pulse at an angle to the axis of fluid flow in a pipe. A second transducer within the first mounting block is angled to direct an ultrasonic pulse in a direction perpendicular to the axis of flow. A third transducer is fixed within a second block at a distance from the first block and is oriented to intercept the direct or reflected acoustic path of a pulse transmitted by the first transducer. An empirical calculation of the time of flight of the pulse from the first to the third transducers is carried out using direct output signals from the transducers, which allows for a determination of the flow rate of the fluid. However, this empirically determined flow rate is not accurate and is corrected for variation in the propagation rate of the transmitted ultrasound pulses by deriving a correlation factor from the output signal of the second transducer.

U.S. Pat. No. 5,052,230 (Lang et al), entitled "Method and Arrangement for Flow Rate Measurement by Means of Ultrasonic Waves" discloses a method and apparatus for determining the flow rate of a liquid in a measuring tube which comprises digitally measuring the total phase shift that will naturally occur between a transmitted waveform and a received waveform of an ultrasonic signal being transmitted and having to travel a distance before it is received within an arrangement comprising two transducers spaced apart on the measuring tube. According to Lang et al, the flow velocity is first determined using known values of the frequency of the ultrasonic wave and the distance between the two transducers and by calculating the difference between the total phase shifts obtained in relation to the ultrasonic signal propagated firstly in the direction of flow and then against the direction of flow. The flow rate of the liquid is then determined by multiplying the determined flow velocity by the known flow cross-sectional area of the measuring tube. Lang et al recognises that the total angular phase shift between a transmitted and received ultrasonic signal is made up of the number of whole wavelengths of the ultrasonic signal between the two transducers and any residual phase angle. The method and apparatus of Lang et al therefore provides a two part solution in which a first arrangement is used to determine the number of whole wavelengths disposed in the measuring tube and, a second arrangement is used to determine the residual or exact phase angle between the transmitted and received signal. It is noted that Lang et al uses digital pulse counting techniques to determine measurement intervals in each part of its two part solution and discloses improvements to the pulse counting accuracy in each part of the disclosed solution. In the whole wavelength determination full wave rectification of the received signal is performed in order to have the received signal exceed a threshold for stopping the pulse counter earlier than an unrectified signal. In the residual phase angle determination, firstly the start phase of a counting frequency signal is varied at the beginning of each counting operation to overcome quantization errors and secondly, where very small residual angles are detected, the digital equivalent of either the transmitted or received signal is inverted thereby adding 180° to the phase angle and thus the duration of a measuring pulse is correspondingly longer for greater resolution. The phase inverting step requires a corresponding delay to be introduced to the non-inverted signal, ether the received or transmitted signal, in order to compensate for the delay caused by the inverter. The whole wavelength determination is limited by an accurate determination of the onset of the arrival of the received ultrasonic signal.

U.S. Pat. No. 5,533,408 (Oldenziel et al), entitled "Clamp-On Ultrasonic Volumetric Flowmeter"; discloses a dual mode clamp-on ultrasonic volumetric flowmeter comprising at least one pair of ultrasonic transducers on the outside surface of a pipe carrying a fluid to be measured in which a time-of-flight measurement principle or a correlation technique are selected depending on whether foreign particles are present in the fluid. Oldenziel et al discloses an improvement in which based on a threshold signal derived from an integrated signal of one of the transducers, a user may preset or select a foreign particle content in the fluid at which to changeover from travel time measurement to correlation measurement.

U.S. Pat. No. 6,351,999 (Maul et at), entitled "Vortex Flow Sensor" discloses a sensor for measuring flow velocity and/or flow rate of a fluid in which turbulent flow is introduced into the fluid by way of a bluff body fixedly disposed along a tube diameter for generating Karman vortices, whose frequency is proportional to the fluid flow velocity. The sensor disclosed by Maul et al is an optical sensor system comprising a laser differential interferometer.

A method and apparatus of more general application is disclosed in U.S. Pat. No. 5,983,730 (Freund et at), entitled "Method and Apparatus for Measuring the Time of Flight of a Signal". Freund et al is directed to the problem of accurately measuring the time of flight of a signal in particular applications where the precision of less than one period of the signal is required such as in flow, level, speed of sound and acoustic impedance measurements. Accordingly, Freund et al discloses a method and apparatus comprising the steps of receiving a transmitted signal and detecting the onset of the signal as it arrives by way of performing a set of operations upon the received signal to provide a discriminated received signal having a critical point that may be used to determine the time of flight of the transmitted signal. The intensive signal processing operations of Freund et at concentrate on the received signal. Freund et al does not disclose any processing operations for the signal as it is transmitted nor any treatment of the transmitted signal waveform before it is received.

U.S. Pat. No. 5,178,018 (Gill) discloses a measurement system for measuring the time for a signal to pass between two transducers to allow the determination of the fluid flow of a gas, as in a gas meter for example. A signal with a phase change acts as a marker, which is transmitted from one transducer and received by another transducer. On receipt, the phase change marker is detected and is used in conjunction with corresponding amplitude information in the received signal to calculate a time of travel of the signal and hence flow rates of the fluid. The system of Gill requires very high bandwidth transducers along with expensive and powerful drive circuitry in order to provide sufficient signal output to overcome background and other noise within flow systems. It is also noted that transducer temperature changes alter the phase and frequency response of the transducers.

In each of the above noted disclosures, provision is made for at least two transducers or transceivers to be arranged for flow measurement in a given single pipe or flow carrier.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

SUMMARY OF INVENTION

It is an object of the present invention to provide a method and apparatus which alleviates at least one disadvantage of prior art arrangements.

In one aspect the present invention provides a method of determining flow in a plurality of carriers for fluid communication, said method comprising the step of:

detecting the flow rate in at least one of the carriers comprising sensing a signal transmitted between a first and a second signal transceiver wherein the first transceiver is adapted to transceive signals in at least two of the carriers.

In another aspect the present invention provides a method of determining flow in an aspirated particle detector system, said system comprising a plurality of carriers in fluid communication with a particle detector, said method comprising the step of:

detecting the flow rate in at least one of the carriers comprising sensing a signal transmitted between a first and a second signal transceiver wherein the first transceiver is adapted to transceive signals in at least two of the carriers.

In yet another aspect the present invention provides apparatus for determining flow in a plurality of carriers for fluid communication, said apparatus comprising:

a sensing arrangement for detecting the flow rate in at least one of the carriers comprising at least one first and second signal transceivers for sensing a signal transmitted therebetween wherein the at least one first transceiver is adapted to transceive signals in at least two of the carriers.

In still another aspect the present invention provides apparatus for determining flow in an aspirated particle detector system, said system comprising a plurality of carriers in fluid communication with a particle detector, said apparatus comprising:

a sensing arrangement for detecting the flow rate in at least one of the carriers comprising at least one first and second signal transceivers for sensing a signal transmitted therebetween wherein the at least one first transceiver is adapted to transceive signals in at least two of the carriers.

Other aspects and preferred features are disclosed in the specification and/or defined in the appended claims, forming a part of the description of the invention.

In essence the present invention stems from the realization that for a single-pipe system, it is required, as a minimum to have two transducers in order to achieve flow measurement and accordingly, a multi-pipe system also requires two transducers exposed to each branch of air flow, however, it is not necessary that they be separate transducers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, improvements, advantages, features and aspects of the present invention may be better understood by those skilled in the relevant art by reference to the following description of preferred embodiments taken in conjunction with the accompanying drawings, which are given by way of illustration only, and thus are not limiting to the scope of the present invention, and in which.

DETAILED DESCRIPTION

Figure 1:
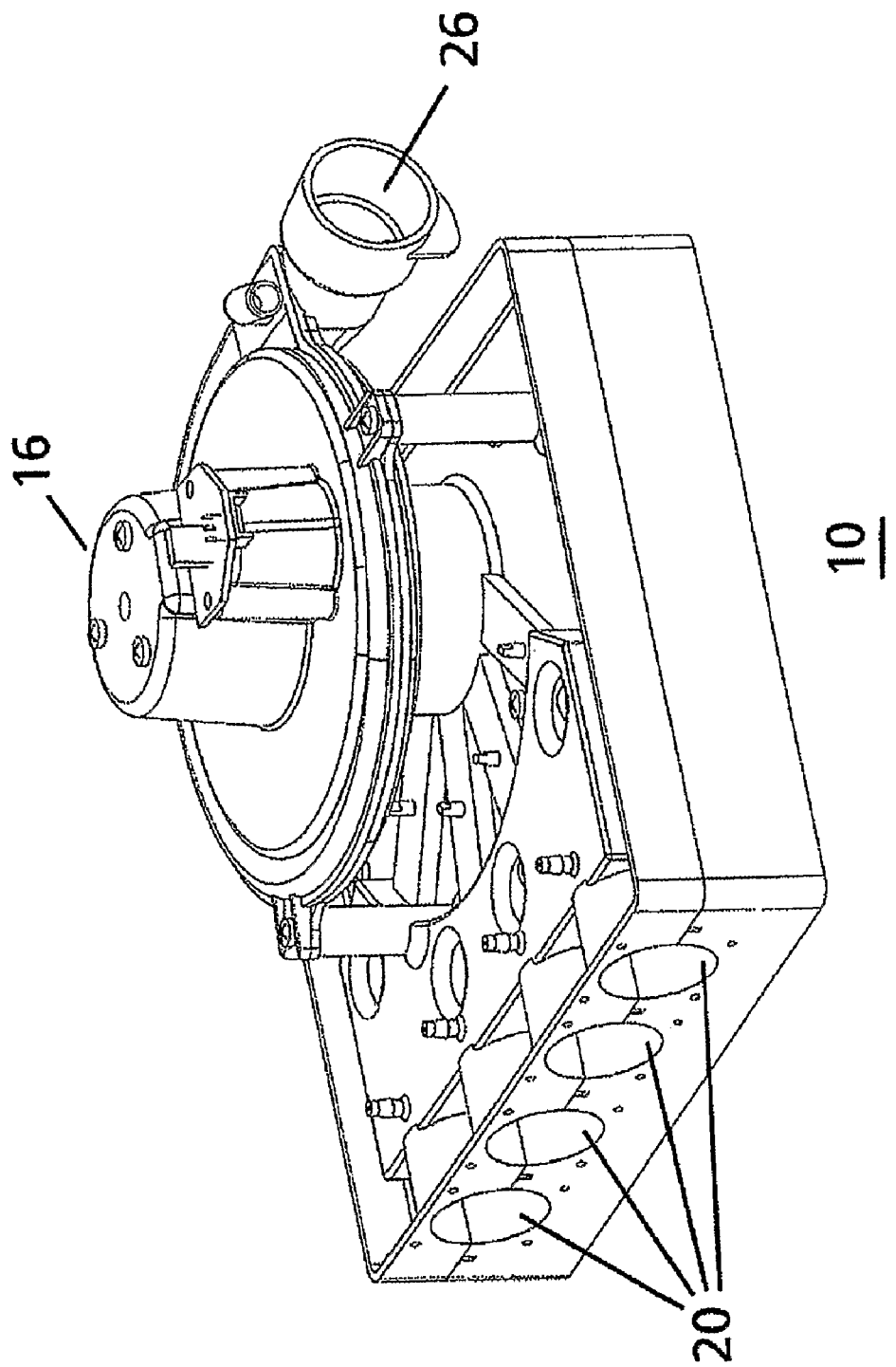
FIG. 1 shows, in part, an aspirated particle detection system, which incorporates a flow determining apparatus in accordance with one embodiment of the present invention.

In one aspect the present invention provides a method of determining flow in an aspirated particle detector system, said system comprising a plurality of carriers in fluid communication with a particle detector, said method comprising the step of:

detecting the flow rate in at least one of the carriers comprising sensing a signal transmitted between a first and a second signal transceiver wherein the first transceiver is adapted to transceive signals in at least two of the carriers.

In one particular embodiment, the method of the present invention may further comprise the step of scanning carriers by performing or applying the step of detecting to the plurality of carriers, selectively. In one form, the selective scanning may comprise sequentially applying the step of detecting to each of the plurality of carriers.

In a preferred embodiment the step of detecting the flow rate further comprises determining the time of flight of the signal transmitted between a first and second signal transceiver. A method particularly suited to detecting the time of flight of a signal transmitted between the transceivers described herein is that described in the Applicant's co-pending International Patent Application No. PCT/AU2004/000639, entitled "Improved Sensing Apparatus and Method", filed 14 May 2004 and whose disclosure is incorporated herein by reference.

In another aspect the present invention provides a flow determining apparatus for determining flow in an aspirated particle detector system, said system comprising a plurality of carriers in fluid communication with a particle detector, said apparatus comprising:

a sensing arrangement for detecting the flow rate in at least one of the carriers by sensing a signal transmitted between a first and a second signal transceiver wherein the first transceiver is adapted to transceive signals in at least two of the carriers.

In the description given herein, a transceiver may be taken to be a device for transmitting a signal therefrom and/or for receiving a signal and may comprise a signal reflector in order to achieve this function or, as a further example, a transceiver may be a signal transducer.

In a further embodiment the second transceiver may also be adapted to transceive signals in at least two of the carriers and this may be in a form of a multifaceted reflector wherein respective facets of the reflector are directed toward corresponding transceivers located in two or more of the plurality of carriers.

In a preferred embodiment, the first transceiver is adapted to transceive signals in at least two of the carriers by comprising a multifaceted reflector wherein one of the facets of the reflector is directed towards a second transceiver located in a first carrier and one or more further facets of the reflector are directed toward further respective transceivers located in one or more further carriers, respectively.

In a further aspect the present invention provides apparatus adapted to determine flow in an aspirated particle detector system, said apparatus comprising processor means adapted to operate in accordance with a predetermined instruction set, said apparatus, in conjunction with said instruction set, being adapted to perform the method(s) as disclosed herein.

In embodiments of the present invention there is provided a computer program product comprising; a computer usable medium having computer readable program code and computer readable system code embodied on said medium for determining flow in an aspirated particle detector system within a data processing system, said computer program product comprising; computer readable code within said computer usable medium for performing the method steps of the methods as described herein.

Figure 2:
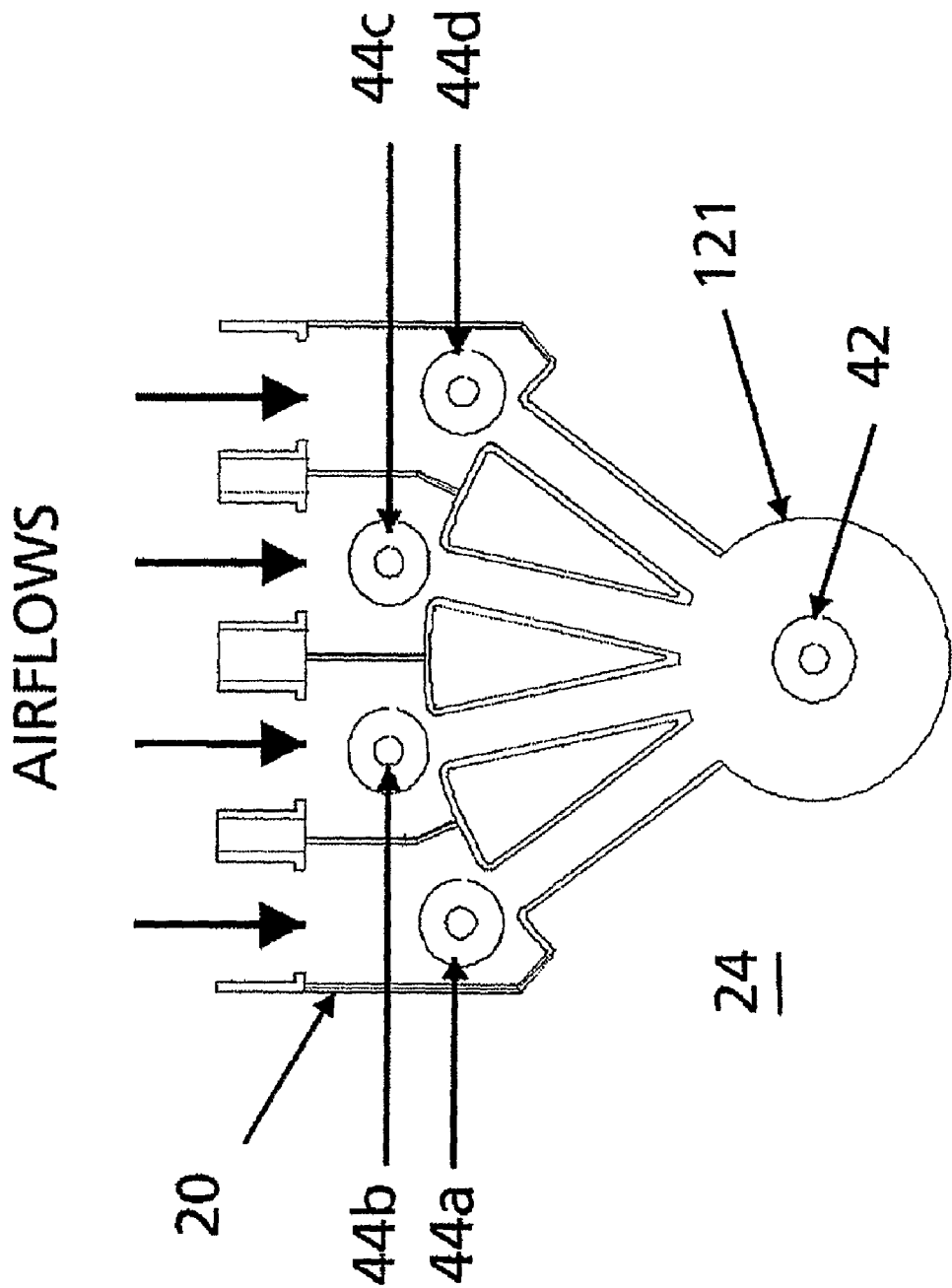
FIG. 2 shows a more detailed plan view of the apparatus of FIG. 1 in which, according to an embodiment of the invention, a flow determining apparatus for a multi pipe arrangement is illustrated using a transceiver shared among a number of flow carriers or channels.
Figure 3:
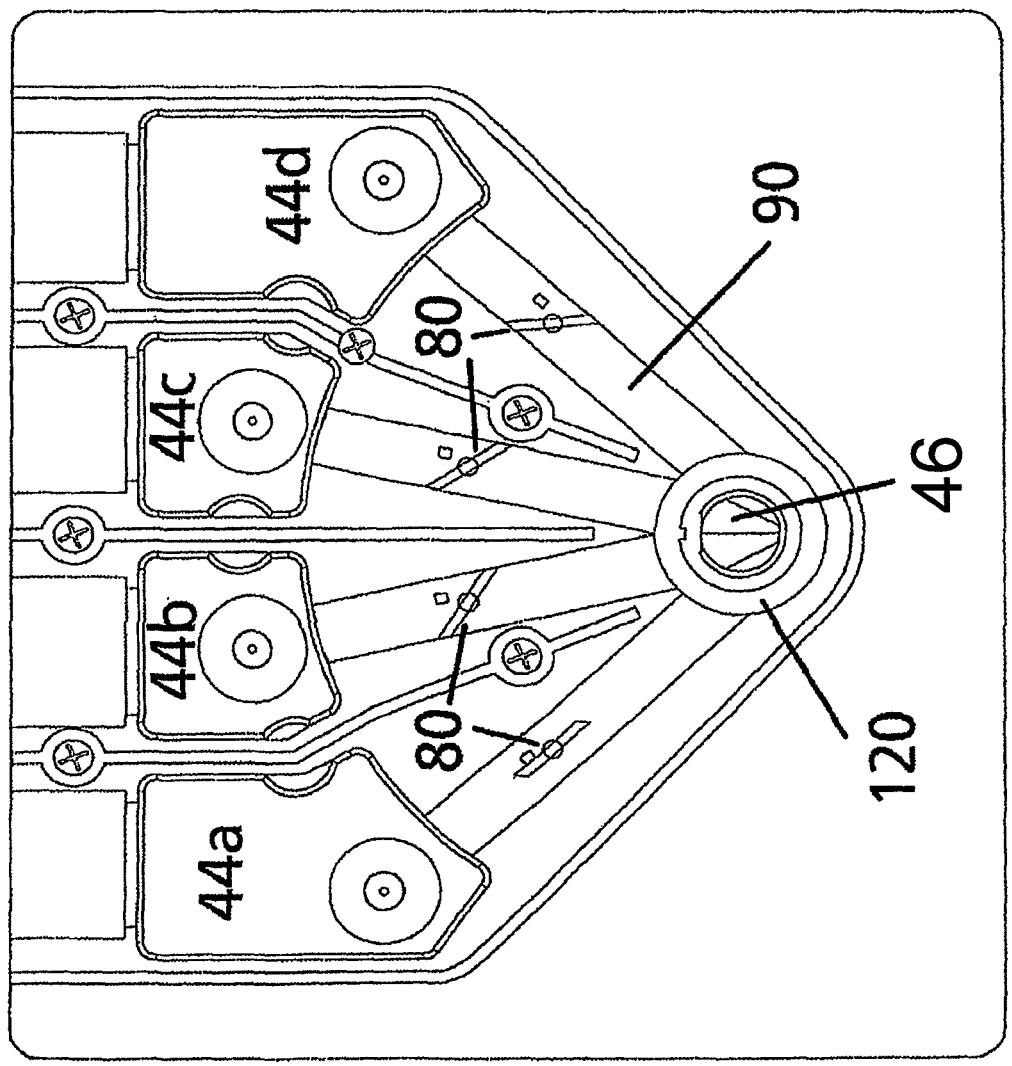
FIG. 3 shows another plan view of the apparatus of FIG. 2 in which, according to a preferred embodiment of the invention, the shared transceiver is a multi faceted reflector.

With reference to FIG. 1 of the accompanying drawings, a particle detector system 10 comprises a particle detector (not shown), attached to an exhaust conduit 26. The detector system 10 has a number of component parts comprising a detector chamber (not shown), an aspirator 16, a filter (not shown), a fluid inlet manifold 20 and an air outlet 120 as shown in FIG. 3, which may comprise a common exhaust manifold 121 as shown in FIG. 2. The air outlet 120 may be connected directly or indirectly to the particle detector. For purposes of clarity the precise fluid flow path within the system 10 is not shown in FIG. 1.

Also associated with the particle detector system 10 is a flow sensor arrangement 24, which is more dearly shown in FIG. 2. In FIGS. 1 and 2 the flow sensor arrangement 24 is in fluid communication with the inlet manifold 20 and aspirator 16.

Inlet manifold 20 is connected to a network of pipes (not shown). Together the network of pipes and inlet manifold 20 comprise individual fluid carriers providing for fluid flow from a number of regions in a monitored area to the particle detector via the flow sensor arrangement 24. Each pipe in the network may have a number of sampling points, which ordinarily comprise holes. The sampling points allow air to be sampled at various places in an area to be protected, such as a building (not shown). The aspirator 16 draws air into the sampling points through the pipe network, through the inlet manifold 20 and into the housing containing the flow sensor arrangement 24. The air sample then passes into the flow sensor arrangement 24. A flow disruptor (not shown) may be located upstream of the flow sensor arrangement 24 to remove the laminar flow characteristics of steady air flow through the pipe network. Furthermore, the aspirator 16 in the detector system 10 draws the sampled air along the pipes, through the inlet manifold 20, the flow sensor arrangement 24, and into the detector chamber, where the particles are detected. If the level of particles exceeds a predetermined level, then the detector system 10 may take a number of actions, such as setting off an alarm, activating fire suppression systems or other activities. The detector system 10 is typically in communication with external devices such as a fire panel (not shown). This system may be employed in a number of environments such as buildings, and a typical system would be a VESDA™ Laser Plus™ smoke detector system as sold by Vision Fire and Security Pty Ltd, attached to a pipe network.

Each flow sensing pair of transceivers shown in FIG. 2 may be an arrangement comprising a first shared ultrasonic transducer 42, and one of a number of second ultrasonic transducers 44a to 44d. In one form the arrangement of the transceiver pairs may be an offset arrangement in one embodiment, each transducer of the flow sensor arrangement 24 shown in FIG. 2 may be in the form of combined receiver/transmitters, such as the US80KS-01 as sold by Measurement Specialties Inc. Each combined receiver/transmitter is a piezoelectric transducer connected to a controller. The control and operation of the transducers is as described in Applicant's co-pending International Application No. PCT/AU2004/000639.

A microprocessor, in conjunction with the receiver circuitry of the transducers measures the time taken for the signals to propagate in each direction.

Although the flow calculated by this method may not account for travel time of the signal through air, which is not directly in the flow path, for example the dead space directly in front of each transducer and outside the flow path, this may be corrected for if necessary by a constant multiplying factor as would be recognised by the person skilled in the art. Notwithstanding such a correction, the following calculation applies in carrying out a flow determination in accordance with an embodiment of the present invention.

For a propagation time in the first direction of $t_1$ and a propagation time in the second direction of $t_2$, the speed of the air flow past the transducers may be calculated as:

$$s = \frac{d}{2}\left(\frac{1}{t_2} - \frac{1}{t_1}\right)$$

where s is the speed of the air and d is the distance between the transducers. It is then a simple matter to determine flow based on a calculation given the cross-sectional area A of the flow path. That is, flow f is $$f = A\frac{d}{2}\left(\frac{1}{t_2} - \frac{1}{t_1}\right)$$

It is possible to determine the propagation time in each of the two aforementioned directions by a number of means, an example of such means being the use of a high-speed electronic digital counter which is triggered by the application of the exciting voltage to the transmitting transducer and halted by the arrival of the received ultrasonic signal at the receiving transducer.

In a further embodiment a digital signal processor may be used to sample the received signal using an analog to digital converter and to then calculate the precise arrival time of a signal by detecting a characteristic feature in the received signal, namely, a waveform characteristic or attribute such as, a peak, or combination of peaks or a zero crossing or combination of zero crossings.

Preferably, the step of determining the time of flight of a signal comprises determining a point of diversion between super positioned corresponding characteristic waveform features of a first and a second received signal wherein one of the received signals comprises a waveform modification introduced at a predetermined point in the signal.

Advantageously, embodiments of the present invention introduce a predetermined artefact or modification to the transmitted waveform in a manner, which allows a marked differentiation between a received waveform with and without the introduced artefact, which provides a stable point of reference for determining the time of arrival of the received signal. Preferably, the introduced artefact to the waveform characteristic may be the result of a phase inversion provided in a cycle of the transmitted signal.

The introduced waveform modification is introduced at a specified point in the duration of a reference signal to distinguish it from a normal unmodified signal. Preferably, the point in the signal duration chosen is one that readily allows determination of the signal's arrival at a receiver. If the transmitted signal comprises a pulse waveform then its duration is given by, the interval between (a) the time, during the first transition or cycle, that the pulse amplitude reaches a specified fraction (level) of its final amplitude, and (b) the time the pulse amplitude drops, on the last transition, to the same level, as would be understood by the person skilled in the art. In this respect, further reference is made to the Applicant's co-pending International Patent Application No. PCT/AU2004/000639 with regard to determining the time of flight or arrival time of signals.

The flow sensor arrangement 24 is useful in order to determine that the air-sampling pipe network is in good order. In a first case, a high flow level indicates that pipe work has become dislodged from the particle detector system 10 or has been broken whereas in a second case, a low flow level indicates some form of pipe blockage. In either of the aforementioned cases, it is likely that the performance of the particle detection system 10 has become impaired so these conditions should be detected and reported so that corrective measures may be enacted.

Determining the rate of flow through a pipe network is often difficult, and many known types of flow sensor require some part of the sensor to protrude into the airflow. The air sampled in a smoke detection system often contains contaminants for example in the form of particles and fibres. These contaminants may cause errors in the flow sensing means of related art mechanisms. For example, in resistive type devices, such as a constant temperature probe, accumulation of contaminants on the probe changes its heat transfer characteristics. Other flow sensors such as moving vane types also project into the air stream flowing through the pipe or housing of the detector and are also subject to contamination. Smoke detecting systems may be required to be situated in the field for many years without calibration, and therefore reliable flow sensing is important. Further, smoke detectors are ordinarily required to operate in a variety of conditions, such as a range of temperatures, humidities and pollution levels. These conditions may affect the performance of the flow meter, affecting the overall performance of the particle detector system 10.

In other related art mechanisms, a restriction, such as an orifice may be interposed within the flow path. A manometer may be used to measure the pressure drop across this restriction, which indicates the level of flow. This approach has the disadvantage that it impedes the flow of air and therefore reduces the efficiency of the aspirator causing excessive air transport time delays or reduced area coverage of the sampled smoke detection system overall. Such systems may also be subject to contamination problems as the restriction accumulates dust, fibres and other matter, causing the flow reading to drift from its correct value.

Further, most related art mechanisms measure the mass-flow of air, which is highly sensitive to density variations with temperature and altitude. Thus, such mechanisms require a compensation means for temperature and pressure in accordance with their individual characteristics incurring extra expense and calibration time. The present invention measures volumetric flow, which is substantially constant with temperature in the present context of an embodiment for an aspirated smoke detection system and is a better measure of pipe work blockage or disconnected pipe work.

In accordance with embodiments described herein, using an ultrasonic flow sensing arrangement within a particle detection system, at least one or more of the above described deficiencies may be overcome.

One major problem of aspirated smoke detector systems is blocking of air flow, for example, in sample holes. It has been very difficult to detect whether one or more sampling holes are blocked. Traditionally this has been addressed by visually checking the sample holes or regular cleaning, whether required or not. Using the ultrasonic flow sensor arrangement 24 it is possible to detect smaller changes in airflow into the detector. As one or more sample holes become blocked, the airflow into the detector drops, and the ultrasonic flow sensor arrangement 24 detects this. Once the flow of air drops below a predetermined value, the detector may indicate a fault, allowing a user to check the pipe network and sampling holes for blockage.

Figure 4:
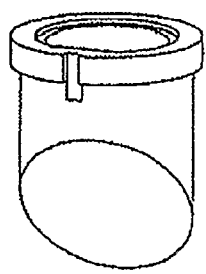
FIG. 4 shows three alternate configurations of the reflector used in the apparatus of FIG. 3 for a) single, b) dual and, c) quad channel flow determination.
Figure 4:
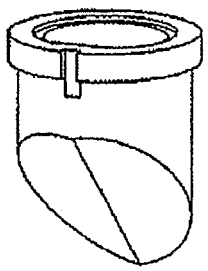
Figure 4:
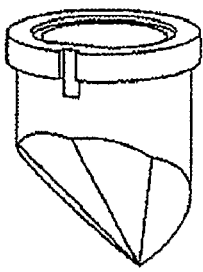
Figure 8:
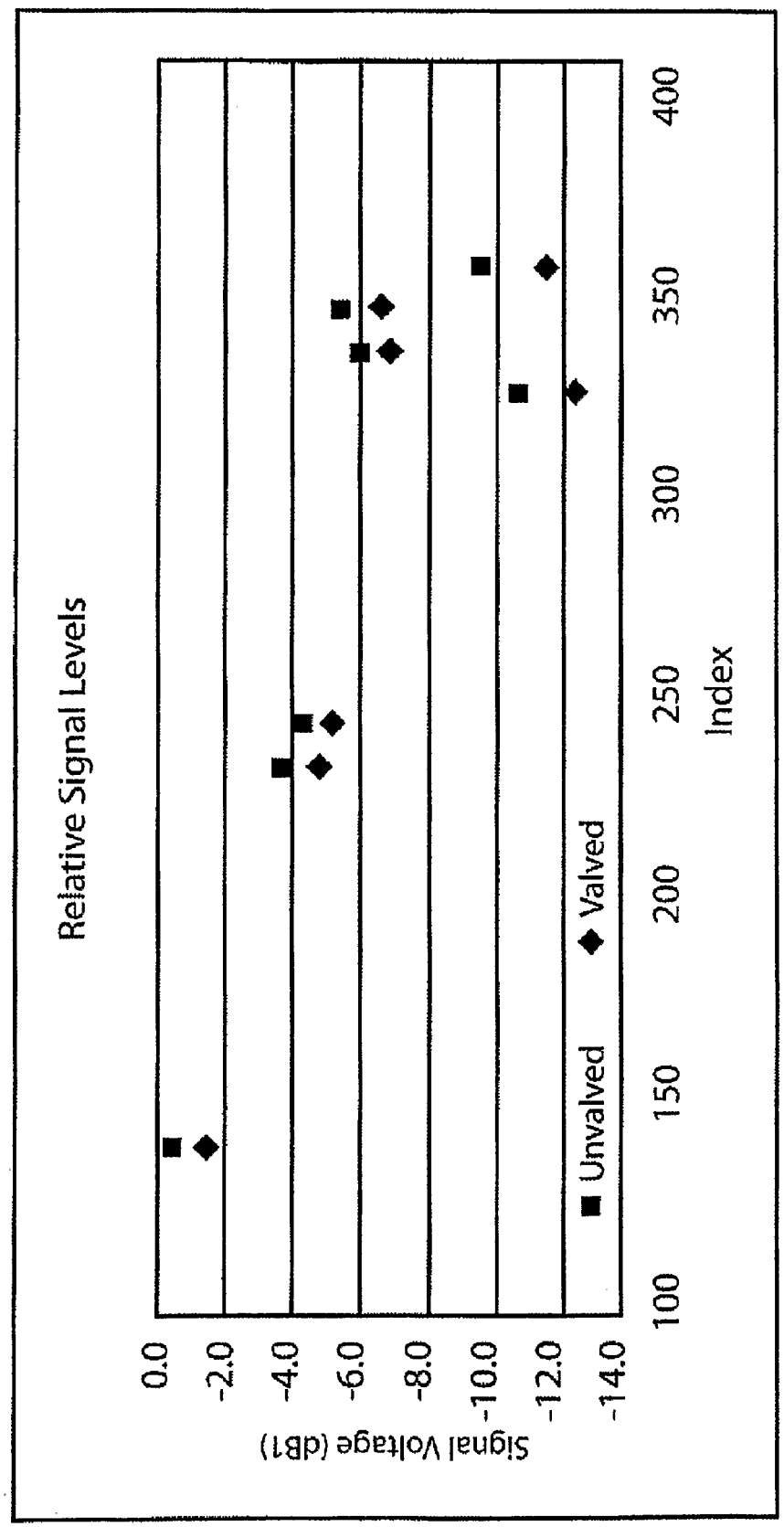
FIG. 8 is a chart of relative signal levels measured with reference to single channel geometry in accordance with a preferred embodiment of the present invention.

With reference to FIGS. 3, 4 and 8 a preferred embodiment is described. Flow carrier and reflector geometries have been developed and investigated, enabling the sharing of transducers between 2, 3, or 4 channels of flow to be monitored. A system incorporating the present invention has been developed and a study conducted on its acoustic and flow properties, specifically:

Acoustic coupling between Tx and Rx transducers for 2-pipe and 4-pipe configurations, compared with that of a single-pipe version.

The effect of vanes (or butterfly valves shown as 80 in FIG. 3) on such coupling The air pressure drop across the metering channels over a range of air flow rates.

Some of the considerations in arriving at the preferred embodiment included:

In-line arrangement of flow channels, simplifying molding and assembly

Essentially equal flow lengths of metering channels (shown as 90 in FIG. 3) or carriers Concept reusability for 1 to 4 channels, with minimum rework.

Attempt to maintain low pressure drop

Allow the use of a channel scanning mechanism by way of using the vanes 80

A device based around the above considerations was constructed using stereo lithography. A feature of this design was a replaceable faceted reflector 46 whose geometry could be tailored to cater to 1, 2, 3 or four channels, without altering the metering chamber or flow determining arrangement 24.

Reflectors were constructed for 1, 2 and 4 channels and are shown in FIGS. 4a), b) and c), respectively. The single channel geometry was considered representative of that used on a single carrier system and was used as a reference for signal level measurements. The level with the 1 Channel reflector has been taken as 0 dB.

The flow sensing arrangement 24 in the form of the experimental metering chamber described and shown in the plan view of FIG. 3 and in its closed form in FIG. 1 comprises an upper and lower half, with radially oriented flow channels, converging to the central faceted reflector. The chamber provides:

Pressure taps for measuring the air pressure drop

Fan mounts

A provision for vanes 80 (butterfly valves) to permit study of signal attenuation due to such vanes PCB mounting holes Reflector mounting arrangement permitting easy changeover of faceted reflectors.

Signal levels were measured for 1, 2 and 4 channel configurations. Transmit excitation was a pulse train comprising 5 pulses at 79.9 KHz, 50% duty cycle, with a repetition rate of 500 Hz, and amplitude of 20V, p-p.

Measurements were taken both in the upstream and downstream directions, with no airflow, with and without valves 80.

An aspect of the preferred embodiment is that the propagation time measurement uses an early part of the received waveform; usually the third or fourth peak, to determine the arrival time of the pulse. This has the advantage of avoiding phase and amplitude errors caused by the arrival of echoes and higher order propagation modes, which are sensitive to temperature.

The results, referenced to the 1-Channel geometry, are summarized in Table-1 below and in the Chart shown in FIG. 8. What the table shows is the results of 3 experiments. The first (around about where the 150 index point is) is the signal level if you have a dedicated pair of transducers per pipe—i.e. no sharing. The second experiment (shown as two squares and two diamonds around the 250 index mark) shows the signal level if you have two flow channels and then share one transducer (so we use 3 transducers instead of 4). The $3^{rd}$ experiment (shown as 4 squares and 4 diamonds) around about the 340 index mark) shows the signal levels across 4 channels.

TABLE 1

Measured signal levels, referred to 1-Channel geometry

UNVALVED

| Channels | FREQ | PAIR | INDEX | UP | DOWN | AVERAGE | dB1 |
|---|---|---|---|---|---|---|---|
| 1 | 79.9 | 1-4 | 140 | 680 | 660 | 670 | 0.0 |
| 2 | | 1-3 | 230 | 427 | 444 | 436 | −3.7 |
| | | 1-4 | 240 | 430 | 416 | 423 | −4.0 |
| 4 | | 1-2 | 320 | 196 | 197 | 197 | −10.7 |
| | | 1-3 | 330 | 331 | 344 | 338 | −6.0 |
| | | 1-4 | 340 | 365 | 357 | 361 | −5.4 |
| | | 1-5 | 350 | 220 | 217 | 219 | −9.7 |

VALVED

| Channels | FREQ | PAIR | INDEX | UP | DOWN | AVERAGE | dB1 | Valve attenuation |
|---|---|---|---|---|---|---|---|---|
| 1 | | 1-4 | 140 | 590 | 584 | 587 | −1.1 | 1 |
| 2 | | 1-3 | 230 | 385 | 412 | 399 | −4.5 | 1 |
| | | 1-4 | 240 | 401 | 378 | 390 | −4.7 | 1 |

TABLE 1-continued

| Measured signal levels, referred to 1-Channel geometry | | | | | | | |
|---|---|---|---|---|---|---|---|
| 4 | 1-2 | 320 | 163 | 163 | 163 | −12.3 | 2 |
|   | 1-3 | 330 | 312 | 323 | 318 | −6.5 | 1 |
|   | 1-4 | 340 | 324 | 322 | 323 | −6.3 | 1 |
|   | 1-5 | 350 | 173 | 171 | 172 | −11.8 | 2 |

In the preferred embodiment described above, with regard to signal level and distribution, Dual Channel levels are approximately 4 dB below reference and therefore should be usable. Quad Channel signal levels were shown to be 5 to 6 dB down on the inner transceiver pair, and 10 dB down on the outer transceiver pair. This suggests there is further scope for improvement of reflector geometry, and it should be possible to attain uniform signal levels across all 4 channels, typically 7-8 dB below reference. It is envisaged that the usable limits of signal level will be determined by S/N ratio considerations, and the extent of averaging and signal processing power available. With respect to the effect of vanes 80 on signal level measurement, the attenuation due to the vanes 80 (open position) was observed to be between 1 and 2 dB. This would indicate that it is possible to use vanes 80 effectively for scanning between channels.

Preferably an airflow disrupter is situated upstream of the flow sensor arrangement 24, to assist the flow sensor arrangement 24 in providing a more uniform determination of flow of fluid (air) within the airstream. In alternate forms, the flow sensor arrangement 24 may be situated before the air is sampled through the detection chamber/particle detector, or after. The flow sensor arrangement 24 may be situated in a number of different locations along the flow path of the air to be sampled. However, for best results in accurately measuring the total flow of the air drawn into the network, the preferred location is at or near the fluid inlet manifold 20. With regard to flow disruption, it has been found that disrupting the flow provides a better estimate of the flow rate as ultrasonic flow detectors appear to average out the flow rate along the pipe if it is not laminar. Laminar flows may be difficult to measure consistently in general, as the flow profile may change.

The flow channels or fluid carriers may take the form of a number of arrangements and geometries. In preferred embodiments as shown in the views of FIGS. 2, 5 and 6-7, the plurality of carriers of the particle detector system may be disposed in an arrangement comprising one or more of:

a radial structure comprising two or more fluid carriers converging upon a central point wherein a first transceiver is located and adapted to transceive signals in at least two of the carriers;

a parallel structure comprising two or more fluid carriers disposed substantially parallel and adjacent each other wherein one or more first transceivers are disposed between fluid carriers such that a transducing surface of the first transceivers is in communication with at least two fluid carriers.

Figure 5:
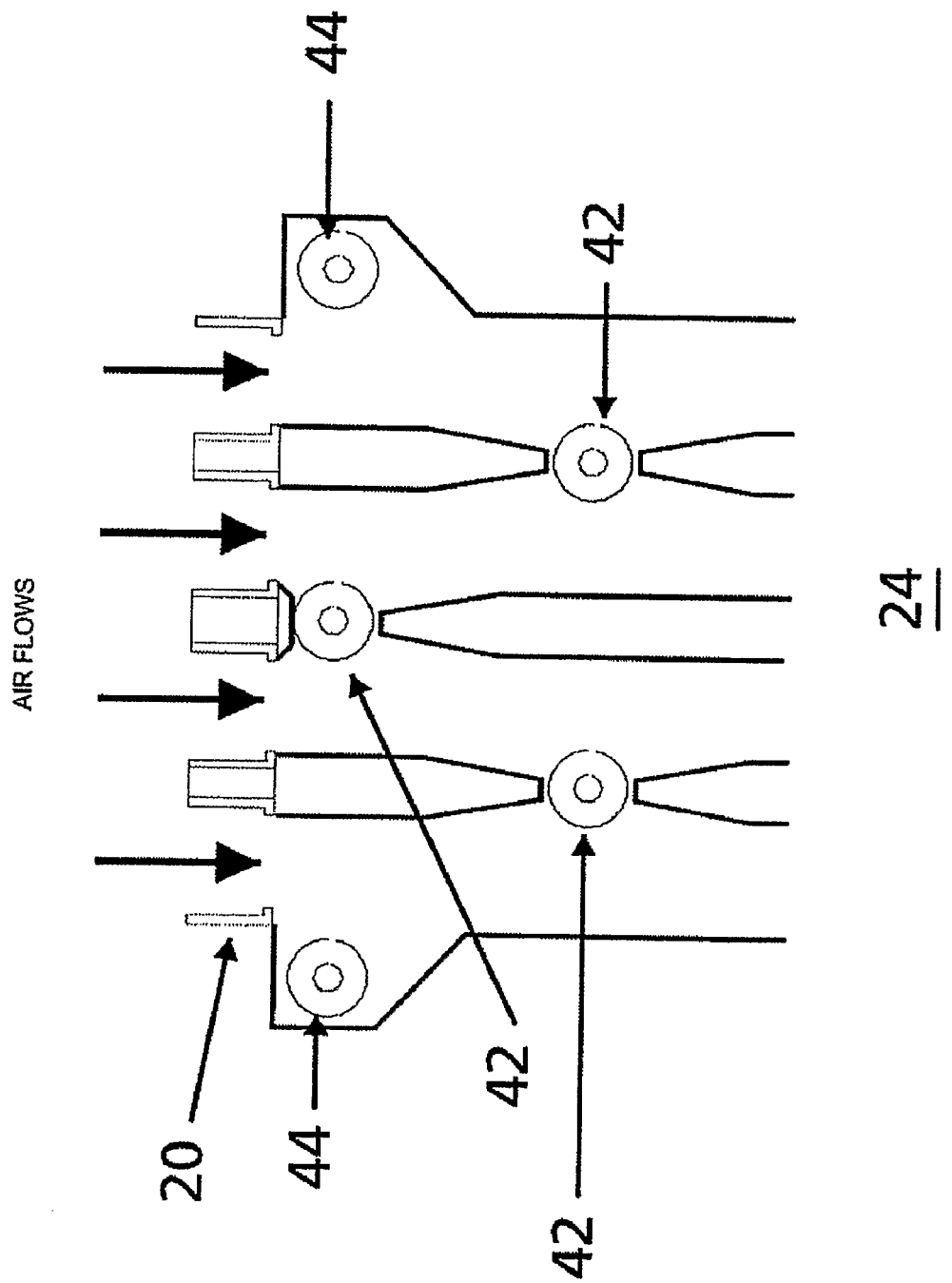
FIG. 5 shows an alternate embodiment of a flow determining apparatus for a multi pipe arrangement using transceivers shared between adjacent pipes or flow carriers.
Figures 6A, 6B:
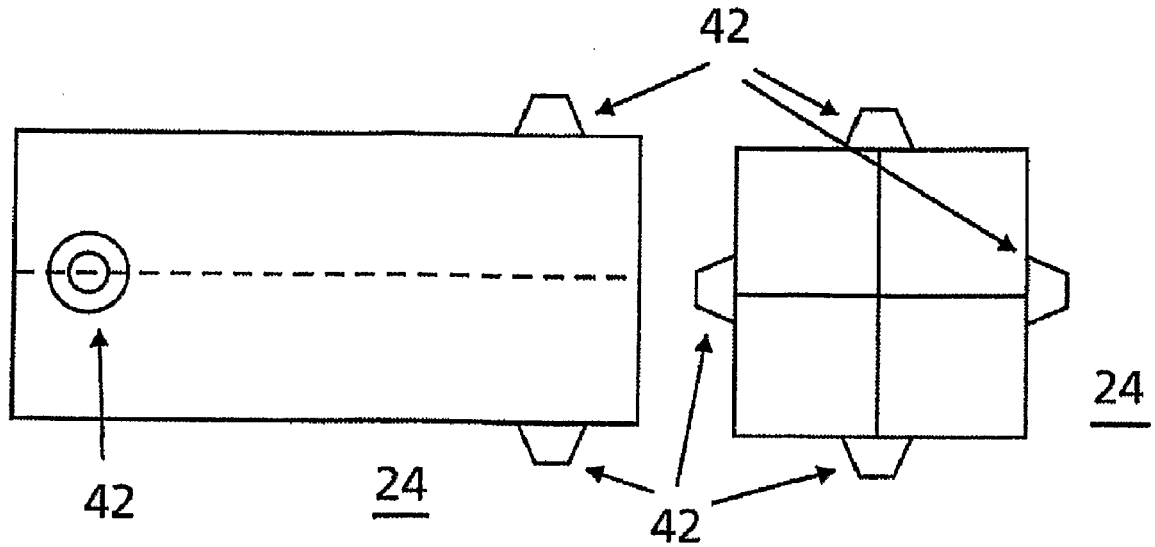
FIG. 6a shows a further alternate embodiment of a flow determining apparatus for a multi pipe arrangement in side view.
FIG. 6b shows the flow determining apparatus of FIG. 6a in end view.
Figure 7:
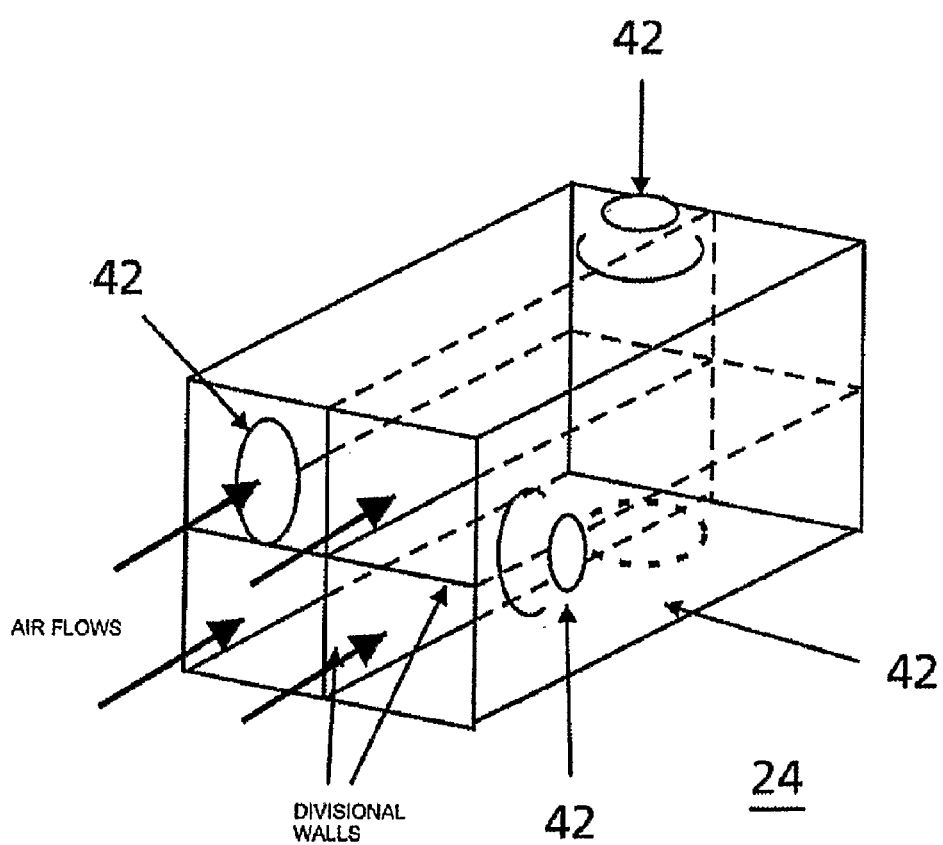
FIG. 7 shows the flow determining apparatus of FIG. 6 in perspective view.

Furthermore, the parallel structure may further comprise one of a planar two dimensional arrangement of fluid carriers, as shown in FIG. 5 and, a three dimensional arrangement of fluid carriers, as shown in FIGS. 6 and 7.

The exemplary alternate arrangement shown in FIG. 5 has like reference characters designating like or corresponding parts throughout the several views of the drawings. Another example of an alternate arrangement of carriers is shown in FIGS. 6 and 7 where a 3 dimensional layered pipe structure comprises the pipes forming a rectangle and each transducer in this arrangement is shared. This arrangement has the advantage that only 4 transducers are required. Again, like reference characters designate like or corresponding parts throughout the several views of the drawings.

In accordance with embodiments of the invention, when used in a particle detector system 10 as described with reference to the accompanying drawings, a flow sensor arrangement 24 as disclosed herein may provide flow measurement capabilities characterized by:

providing a flow measurement function that measures the absolute volume flow rate of sample air through the air sample inlet of a detection system 10, namely fluid inlet manifold 20;

for inlet flow rates in the range 0 to 100 liters per minute, the detector 10 preferably has a monotonic flow measurement characteristic;

while operating over the normal environmental range, as would be familiar to the person skilled in the field of aspirated smoke detectors using sampling pipe networks, a detector system 10 may achieve a maximum airflow rate measurement error of one half of the flow change obtained when any single sample hole is blocked, assuming measurements are averaged over a period of 180 seconds, and;

the detector system 10 may perform its flow measurement function while in a Running state.

The present invention has been found to result in a number of advantages, such as:

It may be possible to save significant component cost for aspirated particle detector systems by sharing transducers between pipes in a multi-pipe aspirating system. For example, in a two-pipe system, this means that three sensors may be used instead of four and, in a four-pipe system; four or five sensors may be used instead of eight.

Ultrasonic flow sensing reports volumetric air flow (liters per minute or equivalent) and is not substantially dependent of pressure or density;

The transducers are placed outside the airflow path so airborne contaminants are not deposited on the transducers;

The system has no moving parts and so is not subject to mechanical wear;

Ultrasonic flow sensing is intrinsically very stable allowing more sensitive detection of flow changes; and A measurement of air flow may be obtained with a high level of confidence given the accuracy of determination of the time of flight of an ultrasonic signal between a transmitting transducer and a receiving transducer where the time of arrival of the signal at the receiving transducer is determined in accordance with embodiments described herein.

It is also envisioned that the arrangement of the present invention may form part of a kit of elements that is distributed in the market where such a kit may comprise, in combination, one or more of:

a particle detector;
a sampling network of fluid carriers;
an aspirator;
a fluid inlet;
a fluid outlet;

a flow sensing arrangement as described herein.

While this invention has been described in connection with specific embodiments thereof, it will be understood that it is capable of further modification(s). This application is intended to cover any variations uses or adaptations of the invention following in general, the principles of the invention and comprising such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the above disclosure. Various modifications and equivalent arrangements are intended to be included within the spirit and scope of the invention and the disclosure herein. Therefore, the specific embodiments are to be understood to be illustrative of the many ways in which the principles of the present invention may be practiced. Where stated in the above disclosure, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

The invention claimed is:

1. A method of determining flow in a plurality of carriers for fluid communication, said method comprising the step of:
    detecting the flow rate in at least one of the carriers comprising sensing an ultrasonic signal transmitted between a first and a second signal transceiver wherein the first transceiver transceives signals in at least two of the carriers.

2. A method as claimed in claim 1 wherein the method is performed in an aspirated particle detector system comprising a plurality of carriers in fluid communication with a particle detector.

3. A method as claimed in claim 1 further comprising the step of:
    performing the detecting in each of the plurality of carriers so as to determine the flow in each of the plurality of carriers.

4. A method as claimed in claim 3 wherein the performing the detecting is applied to each of the plurality of carriers one by one.

5. A method as claimed in claim 1 wherein the step of detecting further comprises:
    determining a time of flight of the ultrasonic signal transmitted between said first and second transceivers of the at least one of the carriers.

6. A method as claimed in claim 5 wherein the step of determining the time of flight of the ultrasonic signal comprises:
    transmitting a first unmodified ultrasonic signal and a second modified ultrasonic signal, wherein the second modified ultrasonic signal comprises a waveform modification introduced at a predetermined point in the ultrasonic signal;
    super positioning the received first and second ultrasonic signals on one another; and
    determining a point of diversion between the first and second ultrasonic signals by comparing waveform characteristics of the first and second ultrasonic signals to one another.

7. A method as claimed in claim 6 wherein the predetermined point in the second ultrasonic signal comprises an initial or early portion of the second ultrasonic signal.

8. A method as claimed in claim 1 wherein the determined flow comprises a volumetric flow rate of air through at least a portion of an aspirated particle detector system.

9. A flow sensor for determining flow in a plurality of carriers for fluid communication, said apparatus comprising:
    a sensing arrangement for detecting the flow rate in at least one of the carriers comprising at least one first and second signal transceivers for sensing an ultrasonic signal transmitted therebetween wherein the at least one first transceiver transceives signals in at least two of the carriers.

10. The flow sensor of claim 9 wherein the at least one second transceiver transceives signals in at least two of the carriers.

11. The flow sensor of claim 10 wherein the transceiver that receives signals in at least two of the carriers comprises a multifaceted reflector.

12. The flow sensor of claim 11 wherein respective facets of the reflector are directed toward corresponding transceivers located in two or more of the plurality of carriers.

13. The flow sensor of claim 9 wherein the transceivers comprise ultrasonic transducers.

14. The flow sensor of claim 9 wherein the apparatus is located proximate a fluid inlet manifold of the aspirated particle detector system.

15. The flow sensor of claim 9 further comprising flow disrupter means located upstream of the sensing arrangement.

16. The flow sensor of claim 9 wherein the plurality of carriers are arranged in one of:
    a radial structure comprising two or more fluid carriers converging with one another at a central point wherein a first transceiver is located transceives signals in at least two of the fluid carriers; and
    a parallel structure comprising two or more fluid carriers disposed substantially parallel to and adjacent each other wherein one or more first transceivers are disposed between adjacent ones of the fluid carriers such that a transducing surface of the one or more first transceivers is in communication with at least two of the fluid carriers.

17. The flow sensor of claim 16 wherein the parallel structure further comprises one of:
    a planar two dimensional arrangement of fluid carriers;
    a three dimensional arrangement of fluid carriers.

18. The flow sensor for determining flow claimed in claim 9 wherein the apparatus forms part of an aspirated particle detector system, comprising a plurality of carriers in fluid communication with a particle detector.

19. A method of determining flow in an aspirated particle detector system, said system comprising a plurality of carriers in fluid communication with a particle detector, said method comprising the step of:
    detecting the flow rate in at least one of the carriers comprising sensing a signal transmitted between a first and a second signal transceiver wherein the first transceiver transceives signals in at least two of the carriers.

20. A method as claimed in claim 19 further comprising the step of:

performing the step of detecting in each of the one or more of the plurality of carriers.

21. A method as claimed in claim 19 wherein performing the step of detecting is applied to each of the plurality of carriers one by one.

22. A method as claimed in claim 19 wherein the step of detecting further comprises:

determining the time of flight between said first and second transceivers of the transmitted signal.

23. A method as claimed in claim 19 wherein the signals are ultrasonic signals.

* * * * *